April 15, 1941.   E. NÖTHE   2,238,532
MEANS FOR SUPPORTING ELECTRIC CONDUCTORS IN AIRCRAFT
Filed July 21, 1939   3 Sheets-Sheet 1

INVENTOR.
Erich Nöthe
BY
Stephen Cerstvik
ATTORNEY.

April 15, 1941. E. NÖTHE 2,238,532
MEANS FOR SUPPORTING ELECTRIC CONDUCTORS IN AIRCRAFT
Filed July 21, 1939 3 Sheets-Sheet 2
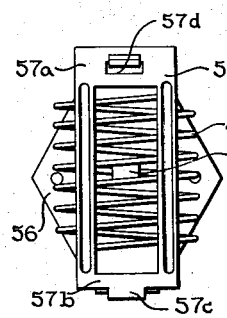
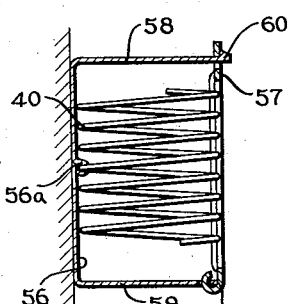
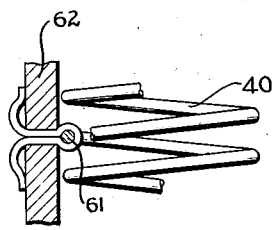
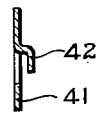
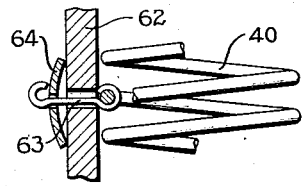
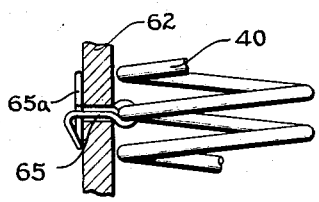
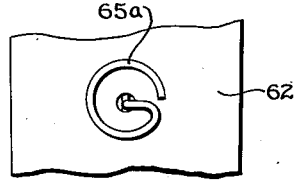
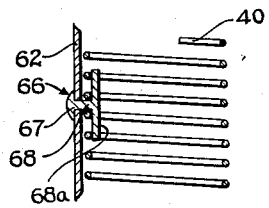
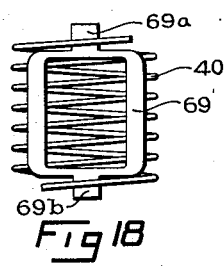
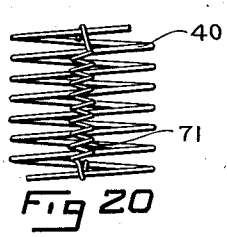
INVENTOR.
Erich Nöthe
BY
Stephen Ceratvik
ATTORNEY.

April 15, 1941.  E. NÖTHE  2,238,532
MEANS FOR SUPPORTING ELECTRIC CONDUCTORS IN AIRCRAFT
Filed July 21, 1939  3 Sheets-Sheet 3
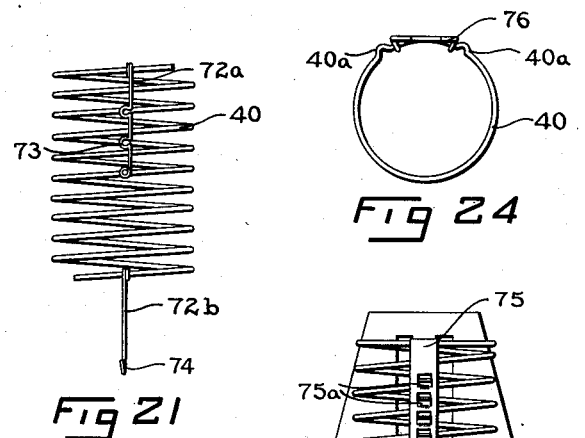
Fig 21
Fig 24
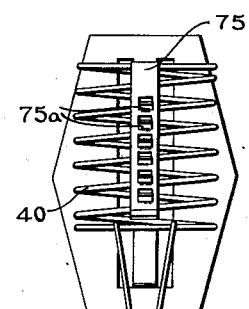
Fig 22
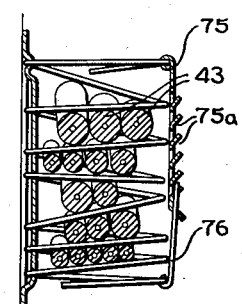
Fig 23
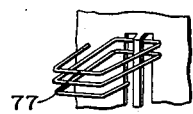
Fig 25
Fig 28
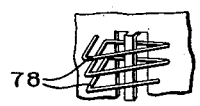
Fig 26
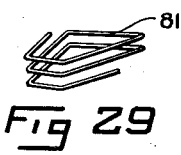
Fig 29
Fig 27
INVENTOR.
Erich Nöthe
BY Stephen Cerstvik
ATTORNEY.

Patented Apr. 15, 1941

2,238,532

UNITED STATES PATENT OFFICE 2,238,532

MEANS FOR SUPPORTING ELECTRIC CONDUCTORS IN AIRCRAFT

Erich Nöthe, Berlin-Spandau, Germany, assignor to Siemens Apparate und Maschinen Gesellschaft mit beschränkter Haftung, Berlin, Germany, a corporation of Germany Application July 21, 1939, Serial No. 285,813
In Germany November 11, 1938

7 Claims. (Cl. 248—68)

This invention relates to means for mounting conductors, and more particularly to means for supporting electric conductors in aircraft.

Devices have heretofore been proposed for mounting or supporting electrical conductors in vehicles, such as aircraft, comprising channels in which the conductors are laid, suitable means being employed for maintaining the conductors in place and for urging the same towards the bottom of the channels. The placing of the conductors in the channels and the adjustment of the means for retaining same has constituted a cumbersome and difficult process. Moreover, the channel arrangements heretofore employed have increased the weight of the craft, have occupied valuable space, and have been ill adapted for the mounting of a plurality of conductors having varying diameters.

One of the objects of the present invention is to provide novel conductor supporting means which are light in weight and easily accessible.

Another object of the invention is to provide novel means of the above character which are adapted for supporting a plurality of conductors of varying diameters.

A further object is to provide novel means of the above character which are adapted for withstanding shocks and vibrations, and for firmly retaining conductors which are held thereby.

An additional object is to provide novel means for supporting one or more electrical conductors which means are inexpensive to manufacture and easy to install.

A still further object is to provide novel conductor supporting means which can be easily removed or replaced, and from which any one of a plurality of electrical conductors can be easily disengaged and removed.

Another object is to provide novel means for supporting insulated electrical conductors which means resiliently grip the conductors without danger of abrading the insulation thereon.

The above and further objects and novel features will more fully appear from the detailed description when the same is read in connection with the accompanying drawings. It is to be expressly understood, however, that the drawings are for purposes of illustration only and are not intended as a definition of the limits of the invention, reference for this latter purpose being had to the appended claims.

In the drawings, wherein like reference characters refer to like parts throughout the several views, Fig. 1 is a front elevation of one embodiment of the invention;

Fig. 10 is a front elevation of a third embodiment of the invention;

Fig. 11 is a side elevation of the embodiment of Fig. 10;

Figs. 12 to 17 illustrate additional modifications of means for securing a helical member to a support;

Figs. 18 to 21 illustrate modifications of means for retaining cables within the grip of a helical gripping member;

Fig. 22 is a front elevation of a fourth embodiment of the invention;

Fig. 23 is a side view, partly in section, of the embodiment of Fig. 22;

Fig. 24 is a top plan view of the embodiment of Fig. 22; and,

Figs. 25 to 29 illustrate different modifications as to the shape of a coiled member employed in the invention.

The forms of the invention illustrated in the accompanying drawings, by way of example, comprise means for resiliently gripping one or a plurality of electrical conductors or cables and for holding the same in place within a vehicle such as an aircraft, said means being constituted by a member having a plurality of resilient coils between which the conductors are held. Means are provided for securing the coiled member to a support and for retaining the conductors between the coils of the gripping member. The term "coiled member" refers to a spiral or volute, to a member having coils in the position of conventional screw threads, and to a member the coils of which are in the shape of the curve or line formed on any solid by a line in a plane that is wrapped around the solid.

Figure 1:
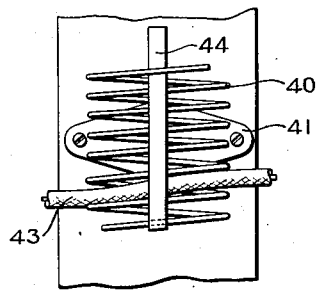
Figure 2:
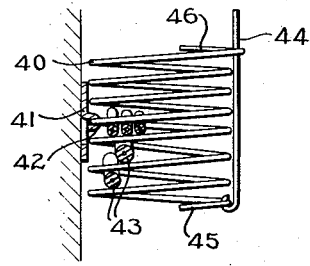
Fig. 2 is a side elevation, partly in section, of the parts shown in Fig. 1.

In the form shown in Figs. 1 and 2, the novel cable or conductor supporting means is constituted by a helical spring member 40 having a plurality of coils. The member is secured to a support, such as a bulkhead, by means of a plate 41 which is preferably bolted to the bulkhead and which engages one of the coils of the spring by means of a tongue portion 42 which is preferably formed integral with the plate 41 and which is curled around said coil. In Fig. 12 a tongue is shown which is formed by punching same from the plate 41, the tongue being uncurled in the figure.

Between the coils of spring 40 electric conductors 43 are disposed and are resiliently gripped thereby, the spring member easily accommodating a plurality of cables of different diameters.

Suitable means are provided for retaining the conductors between the coils and preventing the escape thereof through the openings between said coils comprising a coil bridging element or cable retainer or lateral holder, which in the embodiment of Fig. 1 is constituted by an arm 44 which is pivotally mounted upon a lowermost coil 45 and which is detachably held in an operative position by means of an uppermost coil 46 which can be easily moved to release said arm when it is desired, for example, to remove a cable.

Figure 3:
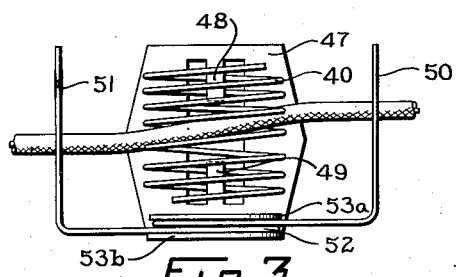
Fig. 3 is a front elevation of a second embodiment of the invention.
Figure 4:
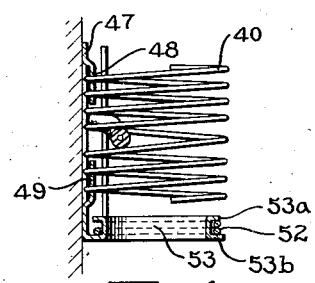
Fig. 4 is a side elevation, partly in section, of the embodiment of Fig. 3.
Figure 5:
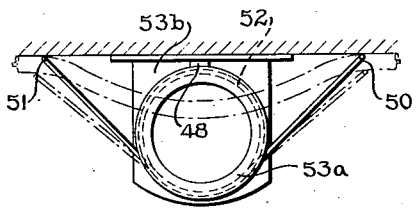
Fig. 5 is a top plan view of the embodiment of Fig. 3.

In the embodiment of Figs. 3, 4 and 5, different means are employed for securing the spring 40 to a support comprising a plate 47 which can be secured to a bulkhead as above described and from which there is removed or punched an H-shaped portion thus forming two oppositely disposed arms 48 and 49 which are preferably bent in such a manner at the bases thereof that the plane of the arms is moved a small amount away from but parallel to the plane of the plate 47 in order that sufficient clearance exist between the arms and the plate for the insertion of the coils of the spring.

Novel means are provided in this embodiment for retaining conductors which are inserted between the coils of the resilient member comprising lateral retaining arms 50 and 51 which are substantially parallel to the axes of member 40 and which are resiliently urged towards a supporting bulkhead or wall by suitable means, for example a coil spring 52, the arms being attached to or integral with opposite extremities of the spring. The axis of the latter is preferably coincident with the axis of member 40, the spring 52 being mounted upon a suitable drum 53 which may be attached to or integral with the plate 47, and arranged beneath the member 40, the drum being provided with retaining flanges 53a and 53b.

Figures 6, 7:
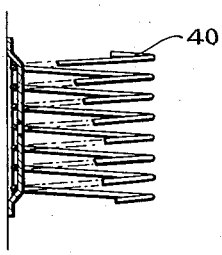
Figure 9:
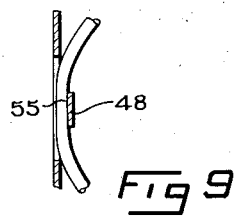

A modification of the means for securing the coiled member to a support is shown in Figs. 6 and 7 which means are identical to that shown in Fig. 3 with the exception that the cut separating the two arms thereof is oblique relative to the axis of spring 40 rather than perpendicular. The advantage of the oblique cut is that each coil of spring 40 is engaged by a retaining arm or parts of both arms whereas in the previous embodiment several coils are not positively engaged by either arm 48 or 49 in the interval between said arms.

Figure 8:
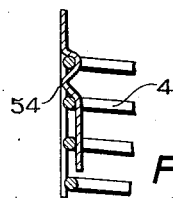
Figs. 6 to 9 illustrate modifications of means for securing a helical member to a support.

In order to prevent undesired movement of the coiled member 40 along the longitudinal axis thereof when the same is held in an arm arrangement similar to that of Fig. 3 or 6, one of the arms may be provided with an indentation or kink 54 (Fig. 8). Also, in order to prevent a turning of the coiled member about its longitudinal axis, a flattened portion 55 may be formed in one of the coils and engaged by a supporting arm, for example arm 48.

A third embodiment of the invention is illustrated in Figs. 10 and 11 comprising a helical spring member 40 supported upon a plate 56 in a manner analogous to that of Fig. 2, i. e. by a tongue portion 56a which encircles a part of one of the coils. Novel means are provided in this embodiment for maintaining a retaining arm or clip-lock 57 in operative engagement with the spring 40, the arm comprising an oblong strip having the central portion thereof removed, thereby forming two parallel arms interconnected at the upper and lower extremities thereof by cross-pieces 57a, 57b respectively. The novel means comprise upper and lower housing plates 58 and 59 which are preferably integral with plate 56, and extend perpendicularly therefrom forming a U-shaped carrier for the arm 57, the latter being pivotally mounted upon the extremity of one of the housing plates by means of a curled hinge 57c formed upon the arm. The opposite arm extremity has a perforation 57d therein which engages in a "snap-lock" connection a projection 60 upon the arm 58 thereby holding the two parallel portions of arm 57 snugly in contact with the coils of the spring.

In addition to the devices hereinabove described for securing the coiled resilient member to a support, other modifications of this means are illustrated in Figs. 13 to 17. In Fig. 13 a conventional cotter-pin or eyelet-loop 61 is employed for this purpose, the legs of the pin extending through a suitable perforation in a support or bulkhead 62 and being bent into engagement with the opposite surface of the bulkhead to prevent withdrawal. The legs are preferably resilient and adapted for urging the coil of spring 40 into close engagement with the supporting wall.

In Fig. 14 a wristpin 63 having loops or eyelets at either extremity thereof is employed, one of said loops engaging a coil of the member 40 and the other being engaged by a bracer spring 64 which urges the wristpin longitudinally whereby the coil is pulled tightly against the wall 62.

The modification shown in Figs. 15 and 16 includes a pin 65 having a loop which engages a coil of spring 40 as above. The extremity of the pin opposite to that of the loop is formed into a circular spring element 65a which engages the surface of a wall opposite to that of the spring 40 and yieldingly urges the loop engaged coil of said spring against the wall.

In the modification of Fig. 17 a rivet 66 having a head 67 and a shank 68, which extends through a perforation in the wall 62, is provided with a T-shaped extremity 68a the arms of which snugly engage one or a plurality of the coils of member 40.

In addition to the retaining arms above set forth, modifications thereof are shown in Figs. 18 to 21. In Fig. 18 a frame member 69 is provided having projections 69a, 69b at opposite extremities thereof which are adapted for detachably engaging the ends of the windings or coils of spring 40. While thus engaged, as shown in the figure, the frame is forced against the coils of the spring, thus preventing conductors or cables held between the coils from escaping therefrom.

In Fig. 19 a simple wire clip 70 is provided, for a purpose analogous to that of member 69, having the upper and lower extremities thereof curled or bent so as to grip the upper and lower coils of the spring 40 respectively.

In order that a member serving as a retaining arm be provided which is adapted for accommodating itself to longitudinal elongation of member 40, the latter holding varying numbers of conductors, and also for aiding the coiled member 40 in resiliently gripping said conductors, a draw spring 71 is provided having loops at the opposite extremities thereof. The loops are adapted for engaging the upper and lower coils of member 40 in a manner analogous to the extremities of clip 70.

A clip-lock or retaining arm 72 of Fig. 21 serves the same purpose as that of Fig. 18 or 19; however, arm 72 comprises two members 72a, 72b the former being constituted by a portion which engages the upper coil of member 40 and is provided with a plurality of eyelets 73, the latter being engageable by a hook 74 upon the extremity of portion 72b which is pivotally mounted upon the lower coil of member 40.

A fourth embodiment of the invention is illustrated in Figs. 22 to 24 comprising a resilient coiled member 40 mounted upon a supporting plate in a manner similar to that shown in Figs. 6, 7 and 8. However, instead of employing a clip member or retaining arm, for example, as in Fig. 21, there is provided a strip 75 preferably of metal having projecting tongue portions 75a formed therein, the strip having one extremity thereof curled around the upper coil of member 40. A U-shaped loop 76, preferably of wire, the ends of which are curled around the lower coil of member 40, may be brought into engagement with one of said tongue portions.

In order to avoid a "creeping" of the members 75 and 76 from their normal positions, the coils of the spring 40 upon which these portions are mounted are provided with suitable kinks 40a adjacent thereto which comprise limit stops therefor. Such kinks are shown, for example, in Fig. 24 in connection with loop 76.

Additional modifications of the shapes of coiled members which may be employed are shown in Figs. 25 to 29 which, when viewed from above, are respectively in the shape of a rectangle 77, a triangle 78, a semicircle 80, and a quadrangle 81, preferably having the non-parallel sides thereof of equal length. If a retaining arm is mounted upon the shortest leg of the members 77, and 81, any creeping of the arm beyond said shortest leg will be prevented.

There is thus provided novel means for supporting one or a plurality of electrical conductors or cables within the resilient grip of coiled spring members having cross sections which are substantially circular or rounded and which therefore have little or no tendency to damage or abrade the insulation of the conductors. The supporting means are extremely light in weight and are especially adapted for use in aircraft. Moreover, the spring supporting member adjusts itself in accordance with the number of cables to be supported.

Although only four embodiments of the present invention have been illustrated and described in detail, it is to be expressly understood that the invention is not limited thereto. For example, instead of employing the resilient spring member for supporting electric conductors, it is possible to employ it on board sailing vessels for supporting lines or ropes. Also, the device is not confined to use in vehicles but may be employed in any stationary structure. Various changes may be made in the design and arrangement of the parts without departing from the spirit and scope of the invention as the same will now be understood by those skilled in the art. For a definition of the limits of the invention, reference will be had primarily to the appended claims.

What is claimed is:
1. A device for quickly and detachably securing one or more electrical conductors of varying diameters in place at a selected point on an aircraft without the use of tools, comprising a helical resilient member having a plurality of coils spaced from each other by a distance slightly less than the diameter of the conductor or conductors to be secured therebetween transversely of the axis of said coils, means for securing said helical member to said aircraft at the selected point, and manually operable means for retaining said conductor or conductors within the grip of the coils of said helical member.

2. A device for quickly and detachably securing one or more electrical conductors in place at a selected point on a structure without the use of tools, comprising a helical resilient member having a plurality of coils spaced from each other by a distance slightly less than the diameter of the conductor or conductors to be secured therebetween transversely of the axis of said coils, means for securing said helical member to said structure at the selected point, and a manually operable clip member engaging two or more of said coils for retaining said conductor or conductors within the grip of said coils.

3. A device for quickly and detachably securing one or more electrical conductors in place at a selected point on a structure without the use of tools, comprising a helical resilient member having a plurality of coils spaced from each other by a distance slightly less than the diameter of the conductor or conductors to be secured therebetween transversely of the axis of said coils, means for securing said helical member to said structure at the selected point, and a retaining member comprising a strip extending transversely of the axis of said helical member and having its ends bent towards said axis to form arms engaging the conductor or conductors to retain them between said coils.

4. A device for quickly and detachably securing one or more electrical conductors in place at a selected point on a structure without the use of tools, comprising a helical resilient member having a plurality of coils spaced from each other by a distance slightly less than the diameter of the conductor or conductors to be secured therebetween transversely of the axis of said coils, means for securing said helical member to said structure at the selected point, and a two-part adjustable manually operable member bridging said coils for retaining said conductor or conductors between said coils and being adjustable along the axis of said helical member in accordance with the number of conductors held by said coils.

5. A device for quickly and detachably securing one or more electrical conductors in place at a selected point on a structure without the use of tools, comprising a helical resilient member having a plurality of coils spaced from each other by a distance slightly less than the diameter of the conductor or conductors to be secured therebetween transversely of the axis of said coils, means for securing said helical member to said structure at the selected point, and a manually operable elastic retaining member of variable length bridging said coils for retaining said conductor or conductors between said coils and adapted to have its length varied in accordance with the number of conductors held by said coils.

6. A device for quickly and detachably securing one or more electrical conductors in place at a selected point on an aircraft without the use of tools, comprising a supporting member permanently secured to said aircraft and having coil engaging means, a helical resilient member having a plurality of coils axially spaced from each other by a distance slightly less than the diameter of the conductor or conductors to be secured therebetween transversely of the axis of said helical member, one or more of said coils being engaged by said engaging means to hold said helical member on said aircraft by said supporting means, and manually operable retaining means for retaining said conductor or conductors within the grip of said coils.

7. A device for quickly and detachably securing one or more electrical conductors in place at a selected point on a structure without the use of tools, comprising a supporting member permanently secured to said structure and having coil engaging means, a helical resilient member having a plurality of coils axially spaced from each other by a distance slightly less than the diameter of the conductor or conductors to be secured therebetween transversely of the axis of said helical member, one or more of said coils being engaged by said engaging means to hold said helical member on said structure by said supporting means, and a manually operable adjustable retaining member engaging at least two of said coils for retaining said conductor or conductors within the grip of said coils.

ERICH NÖTHE.